March 17, 1970    W. T. RENTSCHLER ET AL    3,500,729
PHOTOGRAPHIC CAMERA SHUTTER WITH AN ELECTRONIC TIMING DEVICE
Filed March 3, 1966

INVENTORS
Waldemar T. Rentschler
Winfried Espig
BY - Amster & Rothstein
ATTORNEYS

United States Patent Office 3,500,729
Patented Mar. 17, 1970

3,500,729
PHOTOGRAPHIC CAMERA SHUTTER WITH AN ELECTRONIC TIMING DEVICE
Waldemar T. Rentschler and Winfried Espig, Calmbach, Germany, assignors to Prontor-Werk Alfred Gauthier G.m.b.H., Calmbach, Black Forest, Germany
Filed Mar. 3, 1966, Ser. No. 531,586
Claims priority, application Germany, Mar. 19, 1965, P 36,323
Int. Cl. G03b 7/08; G01j 1/46
U.S. Cl. 95—10　　　　　　　　　　　　　4 Claims

ABSTRACT OF THE DISCLOSURE

A camera shutter provided with a photoelectric timing circuit adapted to regulate the duration of a photographic exposure in response to prevailing light conditions. There is additionally provided a preset timing circuit in parallel with the photoelectric timing circuit to prematurely close the shutters and thus terminate the exposure when the exposure time determined by the photoelectric timer is too long for hand-held picture taking.

---

The invention concerns a camera shutter which has an electronic timing device controlled in dependence upon the subject lighting the drive of which is locked in a position corresponding to the open position of the shutter by means of electromagnetically actuated lock during a period determined by the timing device.

The invention is based on the knowledge that a very significant criterion for the quality of an image is its definition, which can be spoiled by camera movement. It is well known that hand-held exposures cannot generally be made with an exposure longer than 1/30 second without the danger of affecting the definition of the image by unsteady handling or shaking, and whereas a blurred image is in most cases considered useless, an underexposed image if not seriously so, may be regarded as acceptable. Here it should be remarked that both black-and-white and colour (negative) films have a considerable exposure margin; even in the case of under- or over-exposure of the negative within certain limits, a good print is obtainable. The exposure margin in black-and-white films is about two stops, while in colour films one stop inaccuracy is permissible. From this it follows that with a shorter exposure time than the electronic timing device would normally set in a prevailing low lighting intensity, quite good exposures are still obtainable, with a satisfactory degree of sharpness.

Based on this knowledge the object of the invention is to ensure that a shutter of the kind referred to does not produce an exposure time longer than a predetermined value, even if the light conditions prevailing at the instance of exposure require it for correct film exposure.

The problem is solved in accordance with the invention by providing an exposure timing or delay circuit in a shutter of the type referred to, which releases the electromagnetic lock if the timing device attempts to produce exposure time lying above the predetermined limit value during poor prevailing lighting conditions.

Thus a camera shutter is provided which when making hand-held exposures automatically ensures absence of blur, since the timing device normally controlled in dependence upon lighting conditions, is prevented from producing exposure times greater than a predetermined value. Thus, it is no longer possible for images lacking in definition to result when making hand-held exposures.

A simple and advantageous arrangement both from structural and circuit points of view may be obtained in accordance with the invention by the fact that the timing circuit for the predetermined maximium exposure time limit includes a control stage comprising transistor and RC circuits connected in parallel with the control stage of the timing device which operates in dependence upon the lighting. The control stage of the timing circuit adjustable to the predetermined exposure time limit preferably has a switch initiating the charging of a capacitor, the switch being actuated simultaneously with a switch in the timing device controlled by subject lighting.

To obtain a maximum degree of reliability it is proposed in accordance with the invention that the switches initiating the charging of the capacitors in both control stages be actuated by a member of the shutter driving mechanism, for example, by means of the shutter blade driving ring.

Reference should now be made to the accompanying drawings in which.

Figure 1:
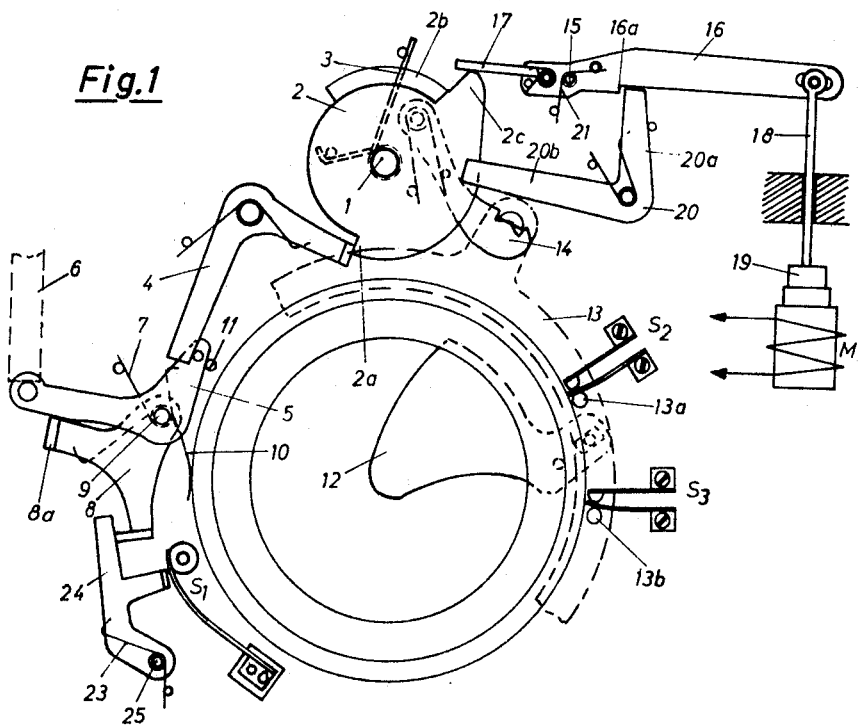
FIG. 1 is a partial illustration of a lens shutter in the cocked state, the driving mechanism actuating the reciprocating movement of the shutter blades being adapted to cooperate with a time-dependent electromagnetically actuable locking device.

In FIG. 1 the numeral 1 designates a shaft mounted so as to be rotatable in a base plate, and 2 designates a driving disc of the shutter driving mechanism. The driving disc 2 is biased by a driving spring 3 arranged on the shaft 1, which spring exerts a clockwise torque on the latter. To retain the driving disc 2 in the cocked state as shown in FIG. 1 a pivotally mounted lever 4 subject to spring action is provided. This lever cooperates at one end with a projection 2a of the driving disc 2 and at the other end with a release lever 5, actuated by the release plunger 6 of the camera which is shown dotted. Lever 5 is subjected to the influence of a coil spring 7 engaging thereon and is mounted so as to be rotatable on a pin 9 together with a further lever 8. The lever 8 is supported under the action of a coil spring 10 on the release lever 5 by means of a bent over flap 8a. Both springs 7 and 10 exert a clockwise torque on the levers 5 and 8 which is resisted by an end stop 11 arranged in the path of the release lever 5. The drawing shows that the driving mechanism for the pivotally mounted shutter blades 12, of which only one is shown in the drawing, is constructed as a crank, the sector ring 13 being in operational engagement with the driving disc 2 by means of a driving pawl 14.

Figure 2:
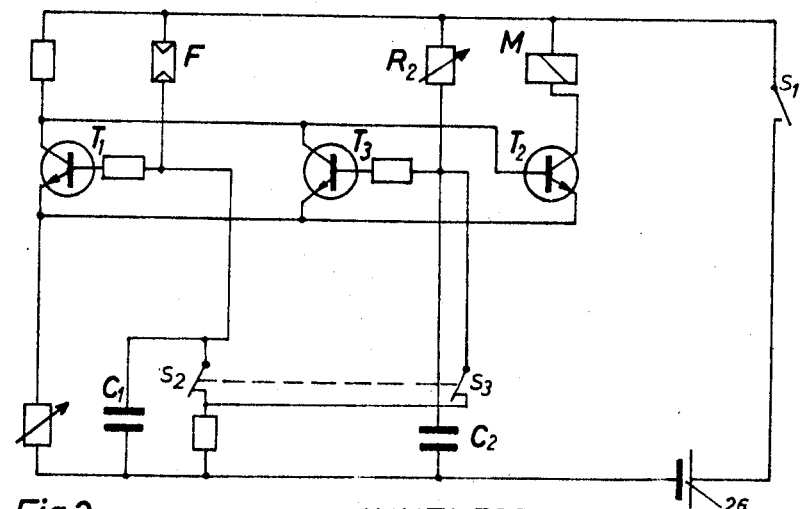
FIG. 2 shows the circuit of an electronic timing device and a delay circuit connected in parallel therewith.

The above shutter driving mechanism is controlled by an electronic timing device, the circuit of which is shown in detail in FIG. 2. This apparatus controls a locking device to be described in detail hereinafter, which locks the shutter driving mechanism in the open state of the shutter blades 12 for a long or short time period. This stop device has an armature lever 16 rotatably mounted on a fixed pin 15, which lever supports a spring-mounted strap 17 at one end and at the other end is connected by means of an articulated coupling rod 18 to the armature 19 of an electromagnet M. A pivotally mounted two-armed and right-angle bent catch lever 20 is associated with the armature lever 16 one lever arm 20a of the lever cooperating with a shoulder 16a of the armature lever 16 and the other arm 20b with the flap 2b of the driving disc 2. Thus the flap 2b when reaching the open position of the shutter blades 12 strikes against the lever arm 20b, whereupon the disc 2 is locked for the duration of the exposure time determined by the timing device. During the cocked state of the shutter shown in FIG. 1, the armature 19 is supported against the electromagnet M, by means of the cooperation of the driving disc 2 with the armature lever 16 a return spring 21 engaging with the armature lever being subjected to increased tension. By means of this spring, the armature lever 16 is rotated counterclockwise as soon as the electromagnet M is de-energized. Hence the catch lever 20 loses its support against the armature lever 16, and the driving disc 2 rotates this lever counterclockwise and hence continues the action and closes the shutter again.

FIG. 1 also shows that the release mechanism has associated therewith an actuating lever 24 supported against lever 8 under the action of a spring 23, the lever being mounted on a fixed pin 25 and serving to actuate a contact switch $S_1$ which comprises a flat spring and a fixed pin moved in synchronism with the release of the shutter driving mechanism. The object of this switch is to close the circuit of a battery 26 of an electronic timing device during the release of the camera. As further shown by the circuit diagram illustrated in FIG. 2, the electronic timing device formed as a delay circuit, comprises a capacitor $C_1$, a photoelectric resistance F variable as to its ohmic resistance in dependence on the lighting conditions, a control transistor $T_1$, and a further transistor $T_2$ connected in series with the electromagnet M. In a separate circuit a further contact switch $S_2$ is arranged, which, as shown in FIG. 1, may be formed from two flat springs, retained in a closed position by means of a pin 13a on the sector ring 13 when the shutter blade driving mechanism in the cocked position. The switch is opened when the sector ring leaves this position to open the shutter blades.

In accordance with the circuit diagram of FIG. 2, the electronic timing device has associated therewith a delay circuit adjustable to a predetermined exposure time limit, the object of which is to release the electromagnetic lock device if the timing device defines a lighting-determined exposure time above the limit value to which the said delay circuit is set. This delay circuit associated with the electronic timing device comprises a capacitor $C_2$, a variable resistance $R_2$, and a transistor $T_3$. In this part of the circuit there is also a switch $S_3$, which like the switch $S_2$ of the electronic timing device is formed from two flat springs cooperating with the sector ring 13. On the latter a pin 13b is provided which in the original position of the ring closes switch $S_3$ and with the beginning of the rotary movement opens it. Concerning the predetermined exposure time delay circuit, adjustable for example, to the exposure time of $\frac{1}{30}$ sec., provision is made for its control stage by the transistor $T_3$ and the associated RC circuit $R_2 C_2$ to be connected in parallel to the control stage of the timing device operating in dependence upon the lighting, and comprising similar elements so that both capacitors $C_1$ and $C_2$ simultaneously commence charging at the beginning of the movement of the sector ring 13. The rate of charging of capacitor $C_1$ is determined by the photoelectric resistance F, while the charging of the capacitor $C_2$ is decided by the resistance of the variable resistance $R_2$. As already indicated, the resistance $R_2$ associated with capacitor $C_2$ may be so dimensioned or so variable that the transistor $T_3$ draws current after a time interval of, e.g., $\frac{1}{30}$ sec. This occurs if the prevailing lighting conditions are so unfavourable that the electronic timing device determines a longer time than that mentioned above. If on the other hand the lighting conditions are so good that the value of the photoelectric resistance F is lower than that of the resistance $R_2$, then the transistor $T_1$ draws current sooner than the transistor $T_3$ and hence after the capacitor $C_1$ has been charged, cause a feedback to the transistor $T_2$ connected in series with the electromagnet M.

The mode of operation of the electromagnetically controlled shutter arrangement shown is as follows:

When the release lever 5 is actuated the contact switch $S_1$ is closed simultaneously with the release of the driving disc 2. Due to the opening movement of the sector ring 13, the two contact switches $S_2$ and $S_3$ open. Consequently, transistor $T_2$ becomes conductive and the two transistors $T_1$ and $T_3$ are nonconductive. The current flows through $T_2$ excites the electromagnet M which retains the stop lever 16 associated with the driving mechanism of the shutter blades 12 in the stop position, with the result that the driving disc 2, after the shutter blades 12 have reached the open position, is held, since the flap 2b strikes against the catch lever 20 of the stop device. While the capacitor $C_1$ of the electronic timing device is charged by the battery 26 via the lighting-dependent photoelectric resistance, the capacitor $C_2$ charges via the resistance $R_2$. Depending upon the resistance value of the resistances F and R2 connected in series with the capacitors $C_1$ and $C_2$, charging of one of the two capacitors is completed sooner than that of the other, unless the time constant of both circuits is the same.

Assuming that the prevailing lighting conditions are so good that the resistance of the photoelectric resistance F is lower than that of the resistance $R_2$ of the delay circuit, then the potential of the base of the transistors $T_1$ increases to such an extent that the latter becomes energized. Then the feedback to $T_2$ causes the current through $T_1$ to increase rapidly, while the current through $T_2$ drops to zero. Consequently, the electromagnet M is de-energized, with the result that the stop device associated with the driving mechanism is removed. In this case the stop lever 16 moves upwardly with reference to FIG. 1 under the influence of the return spring 21 so that the catch lever 20 loses its support and hence releases the driving mechanism to transfer the shutter blades 12 into the closing position.

If the lighting conditions are so bad that the electronic timing device determines an exposure time which lies above the exposure time limit value of $\frac{1}{30}$ sec., then a lengthy exposure is prevented since the capacitor $C_2$ of the control stage of the delay circuit, which is connected in parallel to the control stage of the electronic timing device, charges in $\frac{1}{30}$ sec., because the present value of resistance R2. The potential of the base of $T_3$ now increases to such an extent that the latter becomes conductive. This transistor now produces feedback to $T_2$, whereby the current through $T_3$ increases rapidly while the current through $T_2$ drops to zero, de-energizing electromagnet M and hence unlocking the shutter drive mechanism.

It will thus be seen that the apparatus described prevents the electronic timing device from determining exposure times which on account of their duration would be adverse to hand-held image definition. Preferably, a camera so equipped is additionally provided with an indicating device which informs the operator before exposure whether the exposure time determined by the prevailing lighting conditions lies below or above $\frac{1}{30}$ sec.

We claim:

1. A photographic camera shutter including a shutter blade mechanism having at least one shutter blade and an electronic timing device, the latter comprising a photoelectric exposure timing circuit having a control stage including a first transistor, a first capacitor and a light-variable resistor, said first capacitor and said light variable resistor generating a time dependent voltage at the base of said first transistor in accordance with the intensity of illumination incident on said light-variable resistor; an additional timing circuit adjustable to a predetermined time value, said additional timing circuit having a control stage including a second transistor with its main current path in parallel with the main current path of said first transistor, an adjustable resistor and a second capacitor, said second capacitor and said adjustable resistor generating a time dependent voltage at the base of said second transistor in accordance with the resistance of said adjustable resistor; an electromagnetic lock acting on said shutter blade mechanism to hold said shutter blades open; and a shutter release button acting to open said shutter blades and start said timing circuits, said first and second transistors controlling said electromagnetic lock to energize said lock when said first and second transistors are both in a first state and to deenergize said lock when either of said first and second transistors changes state.

2. A shutter as recited in claim 1 further including a shutter blade actuating ring, means to move said ring to open said shutter blades on pressure applied to said shutter release button, projections on said ring, and two switches, said switches being adapted to be activated simultaneously by said ring, a first of said switches being interconnected with said photoelectric timing circuit so as to initiate charging of said first capacitor, a second of said switches being interconnected with said additional timing circuit so as simultaneously to initiate charging of said second capacitor.

3. A photographic camera shutter as defined in claim 1 further including a lock-controlling transistor in the circuit supplying current to said electromagnetic lock, said lock-controlling transistor being in a conductive state to energize said lock when said first and second transistors are both nonconductive and being in a nonconductive state to deenergize said lock when either of said first and second transistors becomes conductive.

4. A photographic camera shutter as defined in claim 3 wherein said main current paths of said first and second transistors are connected between the emitter and the base of said lock-controlling transistor.

References Cited

UNITED STATES PATENTS

| | | | |
|---|---|---|---|
| 3,326,103 | 6/1967 | Topaz. | |
| 3,349,678 | 10/1967 | Suzuki et al. | 95—53 XR |
| 2,978,970 | 4/1961 | Fahlenberg | 95—10 |
| 3,245,332 | 4/1966 | Kagan | 95—10 |

NORTON ANSHER, Primary Examiner

J. F. PETERS, JR., Assistant Examiner

U.S. Cl. X.R.

95—53